United States Patent [19]

Marschke

[11] Patent Number: 5,209,810
[45] Date of Patent: May 11, 1993

[54] METHOD AND APPARATUS FOR LAYING UP ADHESIVE BACKED SHEETS

[75] Inventor: Carl R. Marschke, Phillips, Wis.

[73] Assignee: Converex, Inc., Madison, Wis.

[21] Appl. No.: 747,788

[22] Filed: Aug. 19, 1991

[51] Int. Cl.$^5$ ............................................. B32B 31/00
[52] U.S. Cl. ..................................... 156/563; 156/64;
156/304.1; 156/324; 156/509; 156/522;
156/552; 206/460; 206/813; 271/226; 271/229;
271/225; 271/251
[58] Field of Search ............ 156/563, 257, 252, 304.1,
156/324, 509, 522, 552, 64; 206/460, 813, 72;
271/226, 229, 225, 251

[56] References Cited

U.S. PATENT DOCUMENTS

| | | |
|---|---|---|
| 3,484,323 | 12/1969 | Chrastil et al. ........................ 156/513 |
| 3,590,552 | 7/1971 | Marschke . | |
| 3,765,993 | 10/1973 | Raffensparger et al. ............ 156/563 |
| 4,012,276 | 3/1977 | Schertler ............................ 156/563 |
| 4,331,501 | 5/1982 | Teed .................................. 156/563 |
| 4,339,299 | 7/1982 | Snellman et al. .................... 156/563 |
| 4,500,241 | 2/1985 | Peters et al. ........................ 156/567 |
| 4,540,458 | 9/1985 | Baughman et al. .................. 156/312 |
| 4,543,147 | 9/1985 | Noto et al. ........................... 156/312 |
| 4,582,421 | 4/1986 | Hamlin et al. ....................... 156/567 |
| 4,743,319 | 5/1988 | Raumcke ............................ 156/64 |
| 4,838,985 | 6/1989 | Karagiannis ........................ 156/522 |

Primary Examiner—David A. Simmons
Assistant Examiner—Merrick Dixon
Attorney, Agent, or Firm—Andrus, Sceales, Starke & Sawall

[57] ABSTRACT

A system for laying up multi-layer stacks of sheets is particularly well suited for making pads of notes having ultra-removable adhesive coatings applied in a narrow strip to the back of each sheet. Large sheets having areas many multiples larger than the size of the individual pads, are applied from a continuous paper web having zone coated adhesive strips applied thereto onto a series of recirculating pallets each of which serially receives a large sheet. The web is applied by pressing the adhesive coated side onto the pallet as the pallet travels through a nip formed by the web carrying roll. Closely spaced end-to-end register of the pallets is maintained through the web-applying nip roll and a perforating blade cooperates therewith to form a weakened tear line across the width of the web which is synchronized to coincide with the gap between adjacent pallets. A severing station downstream of the web applying roll causes rapid displacement of the pallet from the one immediately upstream and severs the web along the tear line, resulting in a large single sheet adhering to each pallet. As the pallets recirculate through the system, multiple layers of sheets are laid upon one another until a desired number of sheets has been attained. The large stacks are subsequently cut along multiple parallel lateral lines, and along longitudinal lines corresponding to the positions of the adhesive zone coats and desired final pad widths, respectively.

12 Claims, 3 Drawing Sheets

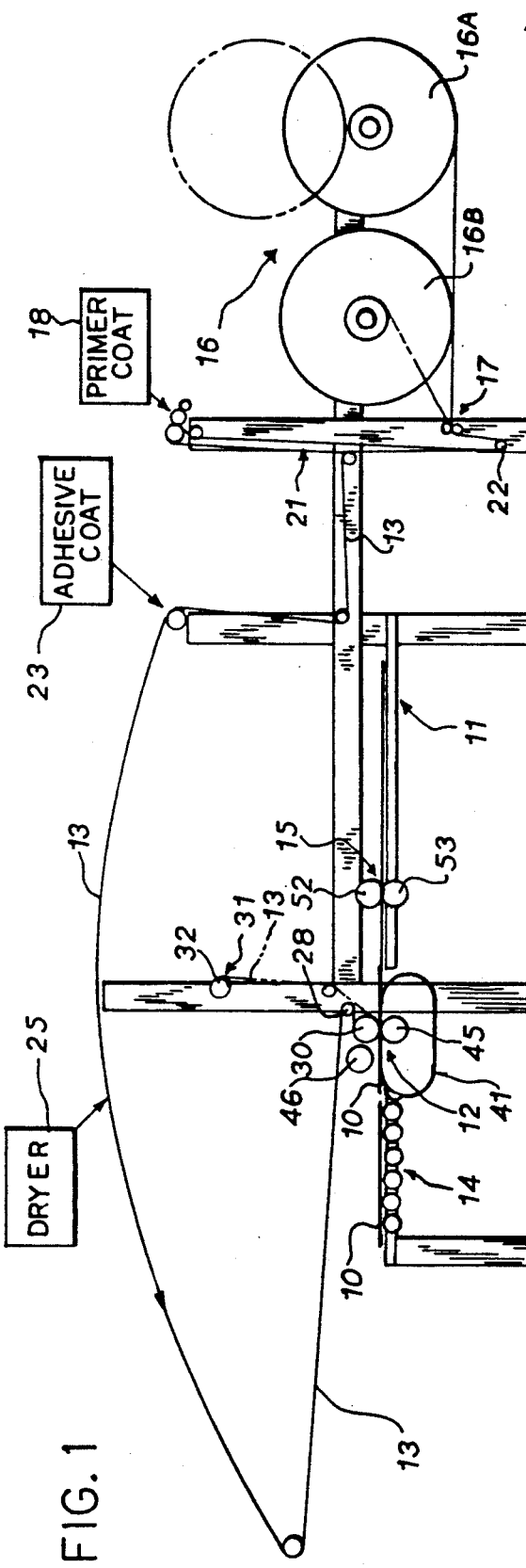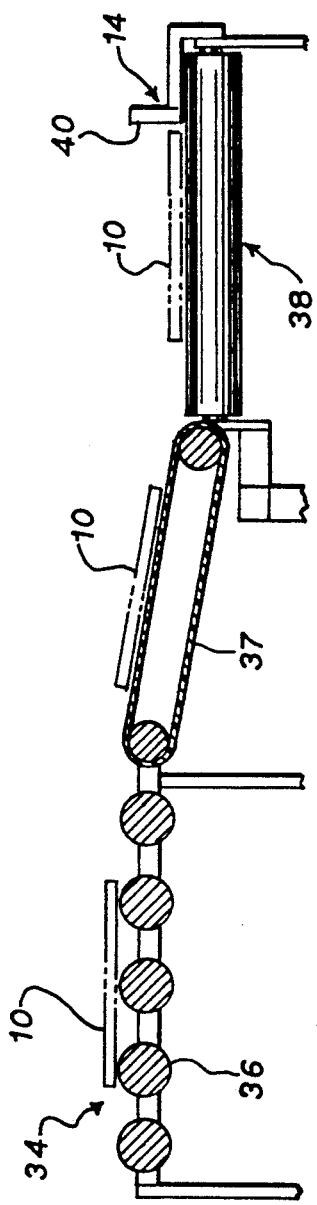
FIG. 1
FIG. 4

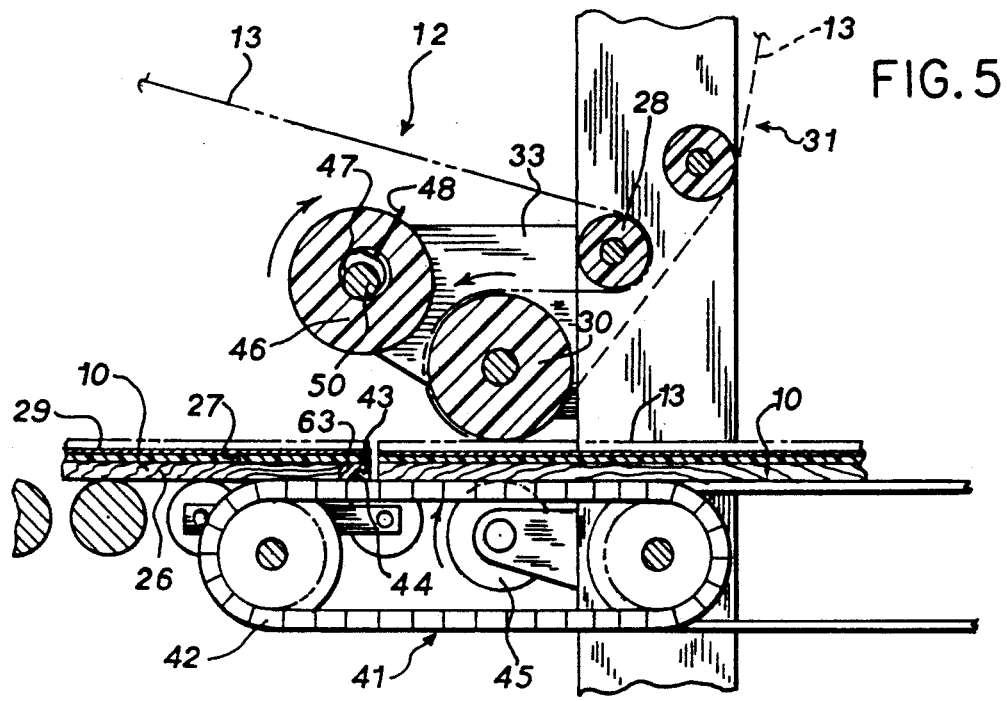
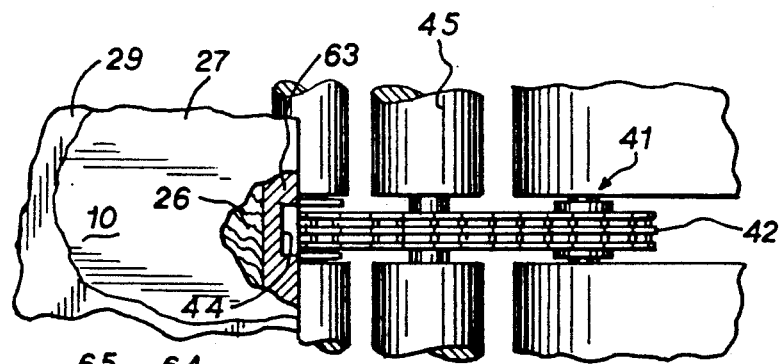
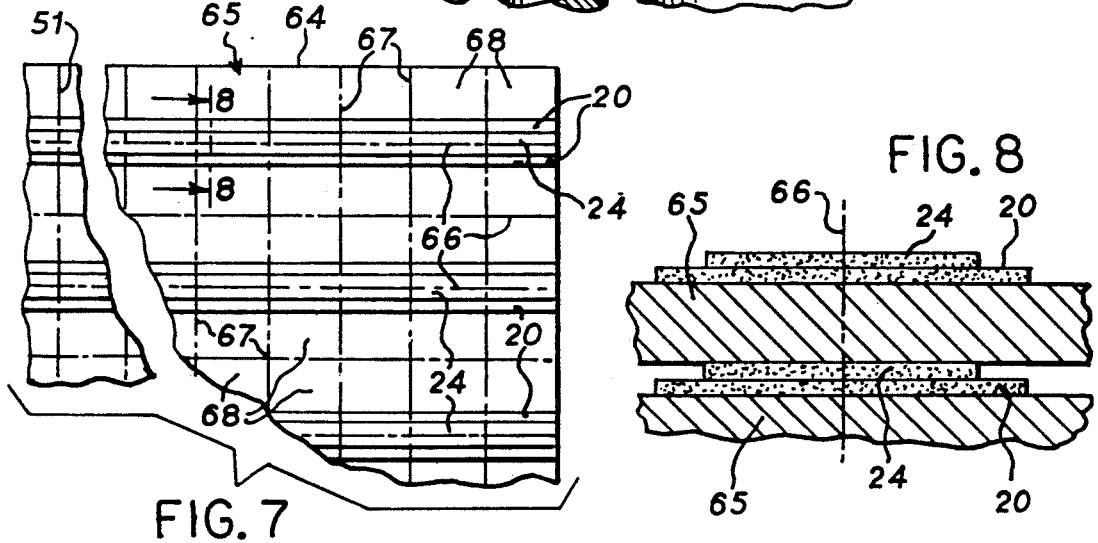

METHOD AND APPARATUS FOR LAYING UP ADHESIVE BACKED SHEETS

BACKGROUND OF THE INVENTION

The present invention relates to the formation of multi-layer stacks of sheets and, more particularly, to the formation of stacks of adhesive-backed sheets of paper to form note pads or the like.

Apparatus and methods for laying up stacks of sheets of paper to ultimately form note pads, writing pads, books, or the like are well known in the art. Oftentimes the sheets are bound together along one edge of the stack by an adhesive coating such that individual sheets may be torn from the pad. The lay up of stacks of sheets of paper prior to the application of an adhesive to bind one edge of the stack is a relatively simple and straightforward operation.

In recent years, the development of ultra-removable adhesives has led to the innovation of adhesive-backed notes or sheets in pad form which may be individually removed and subsequently repeatedly applied and removed from other surfaces. The low tack, ultra-removable adhesives are typically applied in a thin strip on one side adjacent the edge of each sheet in the stack. However, the presence of the adhesive coating interferes with uniform stacking of sheets using conventional sheet stacking methods and apparatus. This has required the development of alternate systems which must be substantially more complex to accommodate the adhesive layer on one side of the sheet which inhibits virtually any sliding movement between sheets as they are stacked.

It would be desirable to have a system which is capable of assembling stacks of multi-layer sheets which are coated on one side with a tacky adhesive in a manner which retains good sheet alignment and is capable of high volume production.

SUMMARY OF THE INVENTION

The present invention is directed to a system for laying up stacks of sheets coated on one side with an adhesive, such as a low tack ultra-removable adhesive, to provide pads or tablets of easily removable and reattachable notes. The system is capable of laying up relatively large sheets having multiple zone coated adhesive strips on one side which, after multi-layer lay up, may be cut by conventional means into a very large number of small individual note pads.

In its most basic embodiment, the system includes means for circulating sheet-receiving backing members serially in multiple-lay-up cycles through a sheet lay-up station to receive on each member an initial layer and successive layers of sheets; means for preparing and feeding a continuous web of sheets into the lay-up station; application means in the lay-up station for applying the initial layer and successive layers from the web to the backing members and the immediately preceding one of each successive layer; and, means for separating each applied layer from the continuous web.

The system also includes means upstream of the web feeding means for applying a continuous adhesive coating to at least a portion of one side of the web. Preferably, the system also includes means upstream of the adhesive applying means for applying a primer coating to at least that portion of the web to which the adhesive coating is subsequently applied.

The circulating backing members preferably comprise a series of flat pallets and the circulating means includes a series of interrelated pallet conveyors. The pallet conveyors operate to circulate the pallets in a manner to maintain precise register of the pallets longitudinally and laterally with respect to the web application means.

The application means includes an upper web-carrying roll which is disposed above the backing member entering the lay-up station and is operable to carry the web in the direction of movement of the backing member through the station, and means for moving the web-carrying roll vertically to bring the portions of the web comprising the initial and successive layers into respective contact with one of said backing members and each of said immediately preceding layers carried on said backing member. The lay-up station also includes perforating means for providing a transverse tear line in the web between each serially applied layer.

The web separating means includes severing means on the circulating means downstream of the web-carrying roll for displacing the backing member and attached layers in the direction of backing member movement relative to the next following upstream backing member to sever the web along the tear line.

This system also includes guide means to effect longitudinal alignment and end-to-end register between each backing member entering the lay-up station and the immediately following upstream backing member. The guide means preferably includes an infeed conveyor with means for aligning each backing member on the longitudinal centerline of the lay-up station and for feeding the backing member into the application means, and a retarding conveyor positioned on the centerline and adapted to receive the backing member from the infeed conveyor to engage the leading edge of the backing member and the member immediately following it to provide and hold a selected spacing between consecutive backing members. The infeed conveyor preferably comprises a lateral side-guide which is disposed parallel to the centerline of the lay-up station and positioned to be engaged by one lateral edge of each backing member, and a first live roller conveyor positioned to convey each backing member in a direction which is skewed with respect to the centerline and into engagement with the lateral side guide.

BRIEF DESCRIPTION OF THE DRAWINGS

FIG. 1 is a side elevation view of the system of the present invention.

FIG. 4 is a sectional view taken on line 4—4 of FIG. 2.

FIG. 5 is an enlarged detail of a portion of FIG. 1.

FIG. 6 is an enlarged detail of a portion of FIG. 2.

FIG. 7 is a bottom plan view of part of a multi-layer stack of sheets assembled in the system of the present invention.

FIG. 8 is a sectional view taken on line 8—8 of FIG. 7.

DETAILED DESCRIPTION OF THE PREFERRED EMBODIMENT

Figure 2:
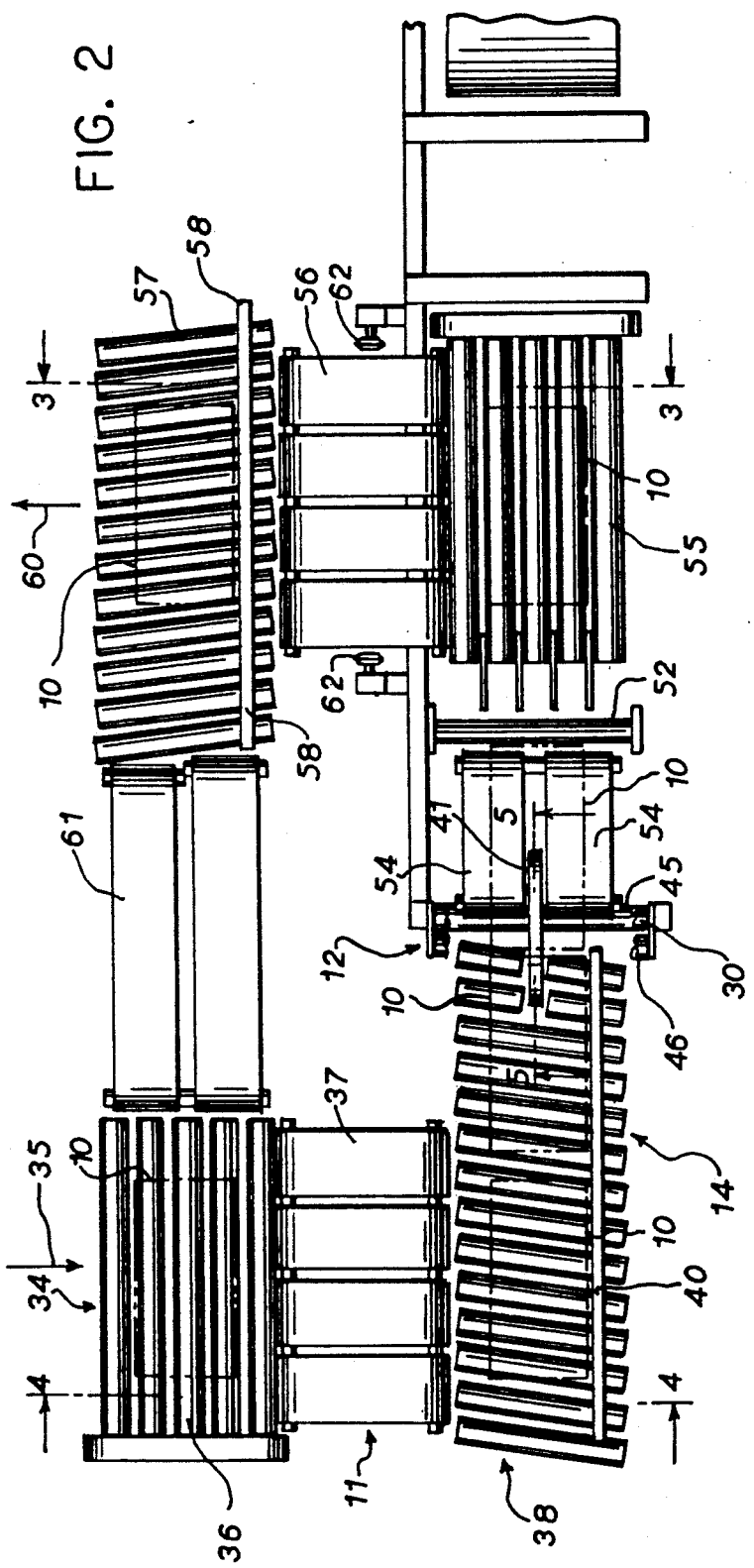
FIG. 2 is an enlarged top plan view of a portion of the system shown in FIG. 1.

Referring to FIGS. 1 and 2, a series of backing members, preferably comprising flat relatively rigid pallets 10, are circulated in series on a multi-component conveyor system 11 through a lay-up station 12 where a continuous paper web 13 having a patterned adhesive coating on one side is applied serially and in successive layers on the pallets. An infeed station 14 upstream of the lay-up station aligns the incoming pallets 10 on the centerline thereof and positions each longitudinally adjacent pair of pallets in precise end-to-end spacing. With the pallets 10 entering the lay-up station 12 in longitudinal alignment and end-to-end register, the web 13 is applied continuously to the serially conveyed pallets. A separating station 15 downstream of the lay-up station 12 causes the pallet leaving the lay-up station to be displaced in the direction of movement relative to the next following upstream pallet to sever the web into an individual sheet forming one layer of the stack being laid on the pallet 10. The conveyor system 11 circulates the pallets 10 to cause each one to continuously re-enter the lay-up station 12 in the same orientation for successive application of the adhesive-coated web which is again subsequently severed in the separating station 15.

The paper web 13 is supplied from one or more rolls 16 of any desired width, such as 4 feet. The web 13 from the selected roll 16A is fed through a splicer 17 which is operable when needed to splice the lead end of the web from new roll 16B to the tail end of the web from roll 16A. The paper web 13 is fed directly from the splicer into a take-up mechanism 21 which may include one or more dancer rolls 22 from which it passes through a primer coat applicator 18 designed to apply a series of laterally spaced and longitudinally continuous zone coats 20 of primer (see FIG. 7). If desired, of course, one entire side of the paper web could be coated with the primer. From the primer coat applicator 18, the web passes through an adhesive coat applicator 23. The adhesive applicator applies a continuous adhesive zone coat 24 over each previously applied primer coat 20. The adhesive preferably comprises a low tack ultra-removable type made of inherently tacky polymeric microspheres which is applied over the underlying primer coat 20. The microsphere based adhesive retains its tackiness for repeated application to and removal from various flat surfaces and the repeatability of use is retained by the affinity of the microspheres to the primer coat, all in a manner well known in the art. From the adhesive coat applicator 23, the web travels through a suitable dryer 25 from which it continues into the lay-up station 12. The web 13 enters the lay-up station 12 with the primer and adhesive zone coats 20 and 24 on the underside facing downwardly.

The lay-up station 12 includes means for applying the web initially to the upper surface of each of the serially circulating pallets 10 and, subsequently, in successive layers over each preceding layer. Each pallet may comprise, for example, a 4 foot by 8 foot plywood sheet 26 to the upper surface of which is secured a thin layer 27 of plastic or other suitable protective material. Preferably, a 4 foot by 8 foot backing sheet is placed and temporarily secured with a low tack adhesive over the top surface of the pallet prior to lay-up of the paper web 13. In the preferred application of the lay-up system, the backing sheet 29 provides note pads with a bottom sheet to which the first or lowermost removable sheet in the pad is adhered. Alternately, the backing sheet may be applied to the bottom of the multi-layer stack after completion of the lay-up process. The web 13 initially passes around an idler takeup roller 28 from which it passes around a driven upper web-carrying nip roll 30.

Immediately after initial startup and until the adhesive coating process is operating properly and the system is synchronized, the web 13 is drawn from the upper nip roll 30 by a rewind apparatus 31 where it accumulates on a rewind roll 32. The upper web-carrying nip roll 30 is carried on a vertically adjustable mounting bracket 33 enabling the roll 30 to be moved toward and away from the circulating pallets 10. In the rewind mode, the mounting bracket 33 and attached roll 30 are raised vertically to hold the roll out of contact with the pallets.

Referring particularly to FIGS. 2 and 4, pallets 10 may initially enter the system at a feed station 34 generally in the direction indicated by the feed arrow 35. As indicated, the upper surface of each pallet preferably has temporarily affixed to it a backing sheet 29. The pallets are initially received on a first live roller feed conveyor 36 from which they pass onto a first transfer belt conveyor 37 where they are conveyed on a slight decline to an infeed conveyor 38 in the infeed station 14. The infeed conveyor 38 is also a live roller conveyor, however, the parallel rollers comprising the infeed conveyor 38 are mounted on a skew with respect to the longitudinal centerline of the infeed station 14 and lay-up station 12. The skewed roller infeed conveyor causes the pallets 10 received from the first transfer belt conveyor 37 to be driven against a lateral side guide 40 mounted above the infeed conveyor, parallel to the system centerline and positioned to be engaged by the long lateral edge of each pallet 10 as it moves along the infeed conveyor 38. The side guide 40 is located so that the lateral edges of each pallet are parallel to the corresponding lateral edges of the web 13 as the pallets enter the lay-up station 12. It is desirable to align the pallets laterally with the web so that the web is laid just slightly inboard of the lateral edges of the pallets to protect the edges of the sheet layers from damage.

To provide and maintain end-to-end register of the pallets 10 as they enter and travel through the lay-up station 12, a retarding conveyor 41 extends from the downstream end of the infeed conveyor 38, under the upper nip roll 30, and through the lay-up station 12 on the longitudinal centerline of the pallets and the web. The retarding conveyor includes a conveyor chain 42 which carries one or more dogs 43 (see FIG. 5) adapted to engage a notch 44 in the leading edge of each pallet 10. The retarding conveyor 41 operates at a speed slightly less than the speed of the infeed conveyor 38 such that the latter causes the pallets to overrun the retarding conveyor 41 until the notch 44 in the forward edge of the pallet engages a dog 43. With a pallet construction having a nominal 8 foot length, the dogs 43 may be spaced at precisely 96 inches and the actual length of the pallets would be accurately set at, for example, ⅛th inch less or at 95⅞ inches. In this case, the retarding conveyor 41 will maintain precise end-to-end register between the pallets in the form of an accurate ⅛th inch gap.

In the lay-up station 12, directly beneath the upper nip roll 30 is a powered lower nip roll 45 which is split centrally on its axis to allow passage of the retarding conveyor chain 42 therethrough. The outer surface of the roll 45 extends slightly above the upper edge of the conveyor chain 42 to engage the underside of each pallet 10 and to form with the upper nip roll 30 a nip for receiving and carrying the pallets and any layers of web material laid thereon. Roll 45 is driven at the same peripheral speed as upper roll 30.

When the adhesive coated paper web is ready and the pallets 10 are circulating through the lay-up station 12, tension is increased on the rewind apparatus 31 to break the web being wound on the rewind roll 32. Simultaneously, the mounting bracket 33 and attached upper nip roll 30 are lowered to bring the roll surface into contact with the leading edge of a pallet 10 just entering the nip between rolls 30 and 45. The adhesive coated surface of the web is pressed onto the pallet as the pallet travels through the nip along the full length of the pallet.

Attached to the mounting bracket 33 with the upper nip roll 30 is a knife roll 46. The knife roll 46 rotates in a direction counter to the nip roll 30 and has attached thereto a radially extending knife blade 48 which is adapted to perforate without severing the paper web 13 being carried on the nip roll 30. The cutting edge of the knife blade 48 is interrupted with a series of equally spaced nicks along its full length across the width of the web. For example, a ⅛th inch nick may be provided approximately every 2 inches such that, when the knife blade contacts the web against the surface of the nip roll 30, the web will be substantially severed, except for a series of ⅛th inch connections equally spaced across the width of the web 13. The knife roll 46 and attached blade 48 are rotatably mounted on a knife roll shaft 50 with a camming apparatus 47 which periodically and synchronously causes a slight radial outward movement of the knife blade against the web and nip roll 30 to provide a transverse perforated tear line 51 (FIG. 7) in the web which will coincide with the ⅛th inch gap between adjacent pallets 10. Although the circumference of the knife roll 46 could be made substantially equal to the length of one pallet, to keep the roll diameter at a more reasonable size, the camming apparatus 47 preferably operates to extend the blade and perforate the web every fourth revolution with a knife roll circumference of approximately 2 feet, i.e. ¼ the length of the pallet. Obviously, other suitable knife roll diameters could also be used, properly cammed to provide a perforated cut every 8 feet. The camming apparatus 47 need only provide a very small radial movement to the knife blade 48, for example, about 0.010 inch (0.25 mm). The blade in essence cuts the paper in the manner of a conventional steel rule die such that the blade penetrates the thickness of the sheet and barely touches the surface of the upper nip roll 50 which is suitably hardened.

The pallets exiting the lay-up station 12 enter the separating station 15 comprising essentially a pair of upper and lower separating nip rolls 52 and 53, respectively. The separating rolls are initially driven at the same speed as the lay-up nip rolls 30 and 45 and are spaced with respect to one another and with respect to rolls 30 and 45 to capture the leading edge of the pallet 10 and the web layer or layers laid thereon just as the trailing edge of the pallet leaves the nip formed by rolls 30 and 45. Separating rolls 52 and 53 are driven in opposite rotational directions in synchronism and the roll drive is provided with a clutch mechanism to cause a short rapid speed increase, thereby increasing the tension in the web and causing the same to break along the tear line 51 in the gap between the tail end of the pallet and the next upstream pallet just entering the nip of lay-up rolls 30 and 45. The low tack adhesive holding the web to the bottom backing sheet 29 on the pallet or to the immediately preceding layer of a previously applied web exhibits adequate strength in shear to prevent the sheet from slipping or being torn from the pallet. After severing, the pallet has a sheet with a zone coated layer of adhesive overlying and coextensive with the surface area of the backing sheet covering the pallet. Each time the pallet is circulated through the lay-up and severing stations, another identical layer is applied thereto allowing a multi-layer stack of sheets of any desired thickness to be laid up.

Support for the pallets between the web lay-up rolls 30 and 45 and the downstream separating rolls 52 and 53 may be provided by a pair of belt conveyors 54 straddling the downstream end of the retarding chain conveyor 41. Belt conveyors 54 could be replaced by idler roller conveyors as well.

Figure 3:
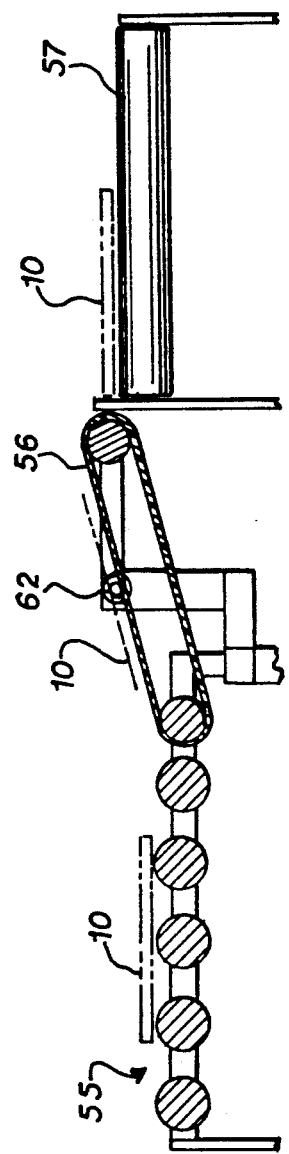
FIG. 3 is a sectional view taken on line 3—3 of FIG. 2.

From the separating nip rolls 52 and 53, the pallet and attached sheets are directed onto a cross-feed conveyor 55 including powered live rollers to effect a right angle movement of the pallet onto a second transfer belt conveyor 56 (see also FIG. 3). Transfer belt conveyor 56 may be disposed at a slight incline and the pallets leaving the head end thereof are deposited onto a skewed live roll conveyor 57 operating generally in a direction transverse to belt conveyor 56. Preferably, a side guide 58 is disposed over the skewed roll conveyor 57 to allow the pallets carried thereon to be driven against the side guide for alignment. Pallets having a desired number of layers laid thereon may also be discharged from the system, either by pulling them manually from the conveyor 57 in the direction of discharge arrow 60 or with a suitable mechanical diverter of any convenient type. Pallets which are intended to be recirculated for the lay-up of another layer continue onto an intermediate belt conveyor 61 from which they are transferred onto the feed conveyor 36 for recirculation through the system as previously described. As may be seen particularly in FIG. 2, directional change of the pallets 10 through the system is always effected by right angle transfer, thereby always retaining the directional orientation of the pallets. Right angle transfer of the pallets 10 may alternately be provided by powered right angle turns which effectively turn the pallets through a full 360° as they traverse the conveyor system 11.

When the multi-layer stack has attained the desired number of sheets, and is ready for discharge from the system on the live roll conveyor 57, the ragged edges of the stack defined by the aligned multiple tear lines 51 which slightly overhang both ends of the pallet, may be trimmed and evened by a pair of edge trimmers 62 on opposite sides of the second transfer belt conveyor 56. The trimmers 62 may be activated automatically or by an operator just prior to manual removal of a pallet as previously indicated.

As shown in FIGS. 5 and 6, the leading edge of each pallet 10 may be provided with a protective metal insert 63, in which insert the notch 44 is formed for receipt of the retarding chain dog 43.

In FIGS. 7 and 8, details of the primer and adhesive zone coats 20 and 24 are shown. The applicators 18 and 23 for the primer and adhesive, respectively, lay continuous longitudinal strips on the web which are spaced laterally across the web width. Considering, for example, a nominal 4 foot by 8 foot pallet having a multi-layer stack of sheets laid thereon, from which it is ultimately desired to produce 3 inch by 3 inch note pads 68, the zone coats might be applied in the following manner. Centered on a line 3 inches in from each lateral edge 64 of the sheet 65, a double width longitudinal zone coat of primer 20 is applied. Subsequently, a double width zone coat of adhesive 24 is applied over the primer coat. Simultaneously, identical double width primer and adhesive zone coats are respectively applied on parallel centerlines at 6 inch intervals across the width of the sheet 65, the last being located 3 inches from the opposite lateral edge of the stack of sheets 65. After the completed stack is removed from the pallet, the stack is sheared or otherwise cut along longitudinal slit lines 66 bisecting the double width zone coats 20 and 24 and each adjacent 6 inch interval, and lateral slit lines 67, each of which slit lines 66 and 67 are at 3 inch intervals. The result is 512 3"×3" note pads 68 each sheet 65 of which is adhered to the one immediately below by a thin adhesive strip along one edge.

It is contemplated that the system of the present invention may be used as well to apply single adhesive-backed sheets to various types of backing members presented serially into the lay-up station 12. Further, the surfaces of the backing members need not be flat, but could be curved as well. For example, easily removable labels could be serially applied to containers or the like having a curved or cylindrical outer surface.

Various modes of carrying out the present invention are contemplated as being within the scope of the following claims particularly pointing out and distinctly claiming the subject matter which is regarded as the invention.

I claim:

1. A system for laying up multi-layer stacks of sheets, each sheet having an adhesive coating on one side to cause each succeeding sheet to adhere to the sheet preceding it, said system comprising:
    means for circulating in series a plurality of independent sheet receiving backing members in multiple lay-up cycles through a sheet lay-up station to serially receive on each member an initial layer and successive layers of sheets with a single layer received in each cycle;
    means for feeding a continuous web from which said sheets are formed into said lay-up station;
    application means in said lay-up station for providing end-to-end registration between adjacent backing members and for applying said initial layer and said successive layers from said web to said backing members and the immediately preceding one of each of said successive layers; and,
    means for receiving each backing member from said lay-up station and for separating each applied layer from said continuous web.

2. The system as set forth in claim 1 including means upstream of said web feeding means for applying a continuous adhesive coating to at least a portion of one side of said web.

3. The system as set forth in claim 2 including means upstream of said adhesive applying means for applying a primer coating to at least a portion of one side of said web.

4. The system as set forth in claim 1 wherein said backing members each comprises a generally flat pallet and said circulating means comprises pallet conveying means.

5. The system as set forth in claim 4 wherein said pallets are conveyed without changes in the orientation thereof.

6. The system as set forth in claim 1 wherein said application means comprises:
    an upper web-carrying roll disposed above said backing member and operable to carry said web in the direction of movement of said members; and,
    means for moving said web-carrying roll vertically to bring the portions of said web comprising said initial and successive layers into contact respectively with one of said backing members and each of said immediately preceding layers carried on said member.

7. The system as set forth in claim 6 including web perforating means in said lay-up station for providing a transverse tear line in the web between each serially applied layer.

8. The system as set forth in claim 7 wherein said separating means comprises severing means on said circulating means downstream of said web-carrying roll for displacing said backing member and attached layers in the direction of backing member movement relative to the next following upstream backing member to sever the web along said tear line.

9. The system as set forth in claim 6 including guide means for providing longitudinal alignment and end-to-end register of each backing member in said lay-up station and the immediate following backing member.

10. The system as set forth in claim 9 wherein said guide means comprises:
    an infeed conveyor including means for aligning each backing member on the longitudinal centerline of said lay-up station and for feeding said backing member into said application means; and,
    a retarding conveyor positioned on said centerline and adapted to receive said backing member from said infeed conveyor, said retarding conveyor operable at a speed less than the speed of said infeed conveyor and including means for engaging the leading edge of said backing member to provide and hold a selected spacing between successive backing members.

11. The apparatus as set forth in claim 10 wherein said infeed conveyor comprises:
    a lateral side guide disposed parallel to said centerline and positioned to be engaged by one lateral edge of each backing member; and,
    a first live roller conveyor positioned to convey each backing member in a direction skewed with respect to said centerline and into engagement with said lateral side guide.

12. The system as set forth in claim 1 wherein said application means comprises:
    a pair of nip rolls including an upper web-carrying nip roll disposed above said backing member and a lower nip roll disposed in supporting contact with the underside of said backing member;
    means for mounting said upper roll for vertical movement to bring the web carried thereon into contact with said backing member and said successive layers; and,
    means for transversely perforating the web to provide a tear line thereacross.

* * * * *